(12) United States Patent
Birnbach

(10) Patent No.: US 9,008,131 B2
(45) Date of Patent: *Apr. 14, 2015

(54) SYSTEM FOR PRODUCING ELECTROMAGNETIC RADIATION

(71) Applicant: Advanced Fusion Systems LLC, Newtown, CT (US)

(72) Inventor: Curtis A. Birnbach, New Rochelle, NY (US)

(73) Assignee: Advanced Fusion Systems LLC, Newtown, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 13/850,839

(22) Filed: Mar. 26, 2013

(65) Prior Publication Data

US 2013/0266104 A1 Oct. 10, 2013

Related U.S. Application Data

(62) Division of application No. 11/754,928, filed on May 29, 2007.

(60) Provisional application No. 60/809,453, filed on May 30, 2006.

(51) Int. Cl.
| | | |
|---|---|---|
| *G21B 1/23* | (2006.01) | |
| *H01F 38/00* | (2006.01) | |
| *G21B 1/03* | (2006.01) | |
| *G21D 7/00* | (2006.01) | |
| *G21B 1/00* | (2006.01) | |

(52) U.S. Cl.
CPC ........ *H01F 38/00* (2013.01); *G21B 1/03* (2013.01); *G21B 1/23* (2013.01); *G21D 7/00* (2013.01); *G21B 1/00* (2013.01); *Y02E 30/14* (2013.01)

(58) Field of Classification Search
USPC .............................................. 372/2
See application file for complete search history.

(56) References Cited

U.S. PATENT DOCUMENTS

| | | | |
|---|---|---|---|
| 4,596,967 A | 6/1986 | Ekdahl | |
| 4,661,783 A | 4/1987 | Gover et al. | |
| 2003/0151366 A1 | 8/2003 | Dayton, Jr. | |
| 2006/0062258 A1* | 3/2006 | Brau et al. | 372/2 |

* cited by examiner

*Primary Examiner* — Jack W Keith
*Assistant Examiner* — Sean P Burke
(74) *Attorney, Agent, or Firm* — Bruzga & Associates; Charles E. Bruzga

(57) ABSTRACT

Disclosed is a system for producing electromagnetic radiation with enhancement from a drift tube containing a cylindrical Smith-Purcell structure. The system includes a magnetically insulated linear oscillator. The oscillator includes a cylindrical resonant cavity having a traveling wave electron gun and a cooperating anode. The drift tube is formed of a hollow cylindrical conductive element that is positioned within a resonant cavity of the oscillator. The drift tube includes an inner surface and a pair of ends. The drift tube may be adapted such that the interaction between an electron beam, from the electron gun, passes through the inner space of the drift tube, and the internal grating, so as to produce RF radiation by the Smith-Purcell Effect. Spacing, face angle and shape of the grating, and the energy of the electron beam are determinants of the frequency of the RF radiation.

3 Claims, 3 Drawing Sheets

Fig. 3B

SYSTEM FOR PRODUCING ELECTROMAGNETIC RADIATION

CROSS-REFERENCE TO RELATED APPLICATIONS

This application is a divisional application of U.S. patent application Ser. No. 11/754,928, filed May 29, 2007, for Method and System for Controlled Fusion Reactions, claiming priority to U.S. Provisional Patent Application No. 60/809,453 entitled "Method & Apparatus for Controlled Fusion Reactions" filed May 30, 2006. The foregoing applications are hereby incorporated herein by reference in their entireties.

FIELD OF THE INVENTION

The present invention relates to a system for producing electromagnetic radiation incorporating a drift tube modified to enable output of higher frequencies from a high power RF source incorporating the drift tube.

BACKGROUND OF THE INVENTION

Prior art Magnetically Insulated Linear Oscillators (MILOs) are high power RF sources, which have typical outputs between 300 MHz and 3.5 GHz. For various applications, it would be desirable to provide a high power RF source that can achieve even higher frequencies.

SUMMARY OF THE INVENTION

The present invention relates to a system for producing electromagnetic radiation incorporating a drift tube which includes a hollow cylindrical conductive element having a grating surface formed on its inner surface, with the ends of the cylindrical conductive element being radiused to minimize electrical stress buildup.

The interaction between a relativistic electron beam from an electron source passing through the inner space of the hollow element and the internal grating produces RF radiation by the Smith-Purcell Effect. The spacing, face angle and shape of the grating, and the energy of the electron beam, are determinants of the frequency of the RF radiation.

The foregoing drift tube, having a grating on the inner surface of a cylindrical drift tube, can be used advantageously to increase the frequency output of such devices as a Magnetically Insulated Linear Oscillator (MILO) beyond the aforementioned range of 300 MHz to 3.5 GHz mentioned for a MILO.

DETAILED DESCRIPTION OF THE INVENTION

A list of drawing reference numbers, their associated parts and preferred materials for the parts can be found near the end of this description of the preferred embodiments.

RF Energy Drivers

Figure 1:
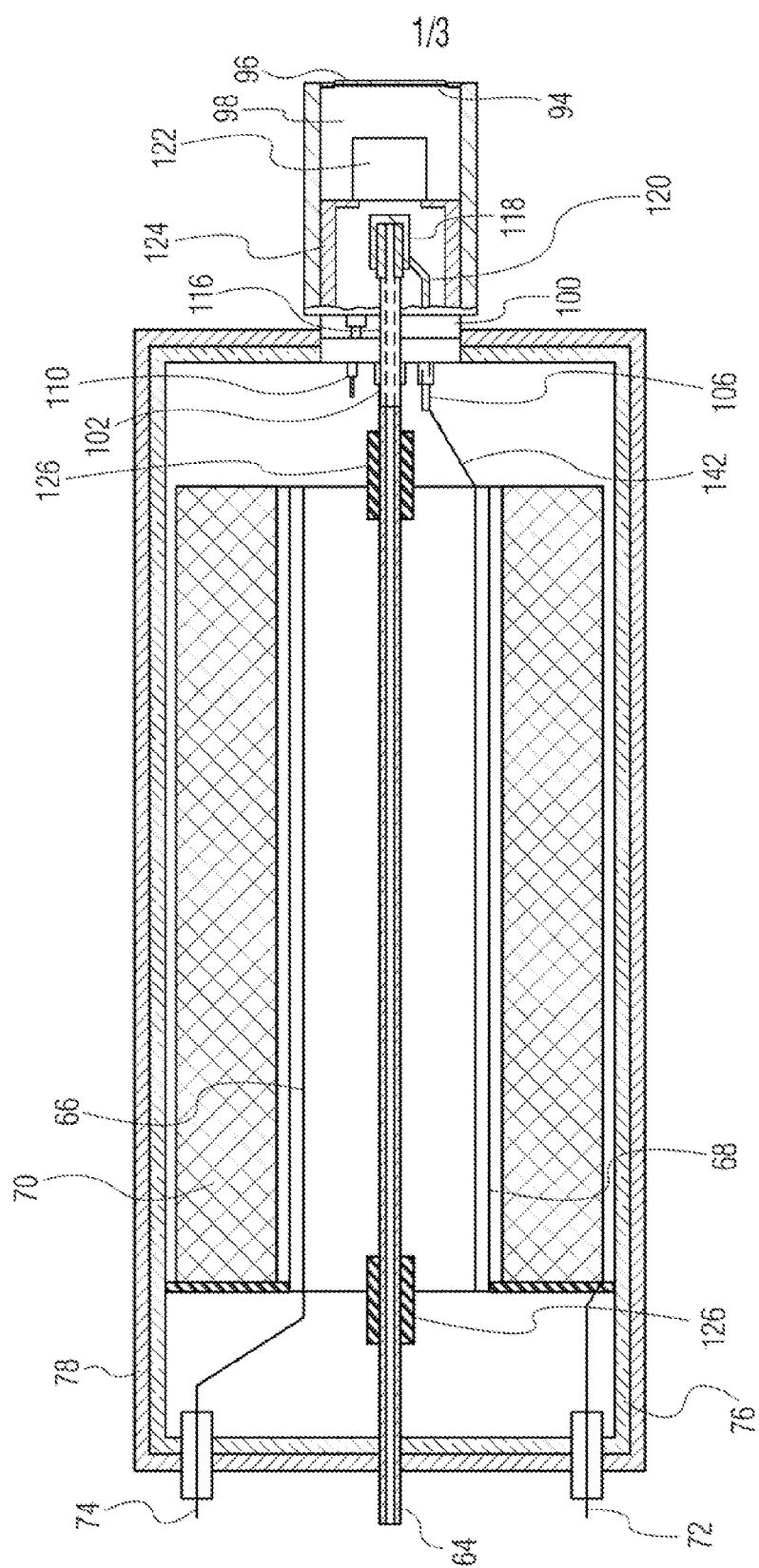
FIG. 1 is a sectional view along the length of a combined SXE-MILO driver.
Figure 2:
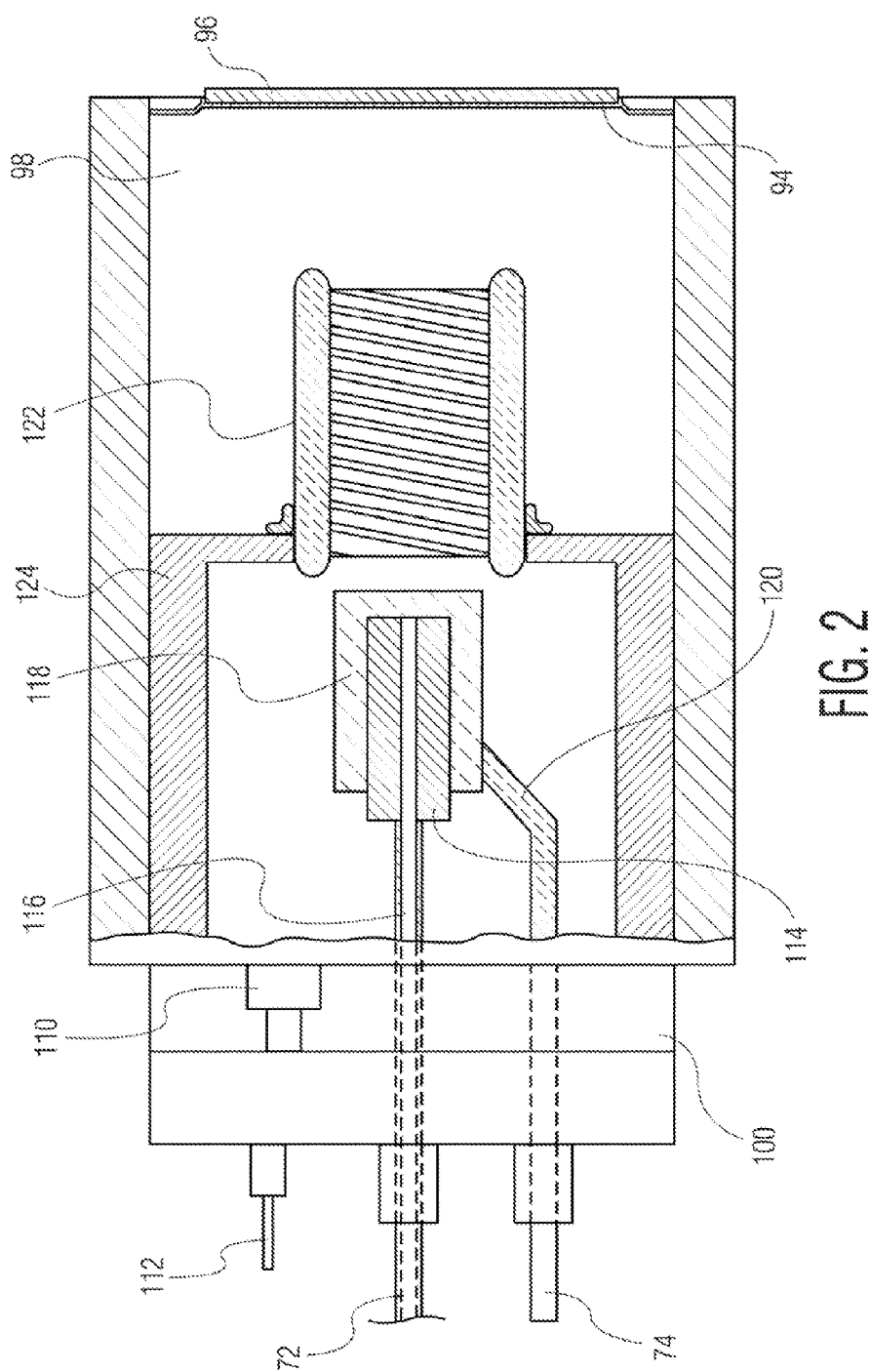
FIG. 2 is a partly sectional view along the length of the MILO RF head of FIG. 1.
Figure 3A:
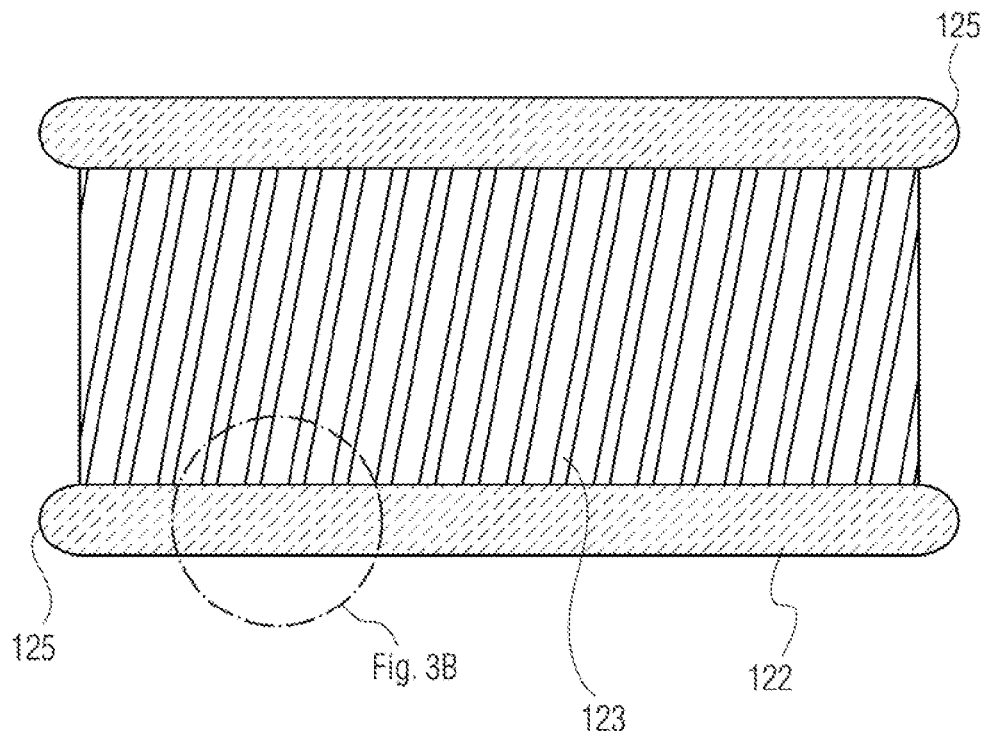
FIG. 3A is a sectional view along the length of a Drift Tube used in the MILO RF head of FIG. 1.
Figure 3B:
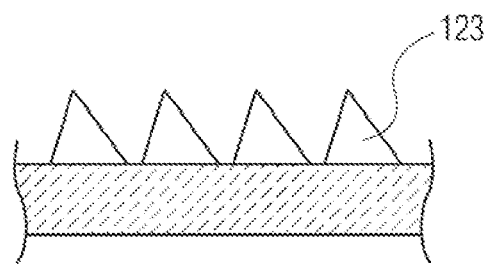
FIG. 3B is an enlarged view of the circled region in FIG. 3A entitled "FIG. 3B".

FIG. 1 shows a cross-section of a Stimulated X-ray Emitter (SXE) combined with a Magnetically Insulated Linear Oscillator (MILO) at the output (right-shown) end of the SXE. The Stimulated X-ray Emitters were first described by the inventor of this current invention in U.S. Pat. No. 4,723,263. The MILO is another well known, high power RF source, similar to the Vircator. The significant difference is that it can produce much higher frequencies than the Vircator. Structurally, the major difference is the incorporation of a drift tube 122 of FIG. 3A and use of a Traveling Wave Electron Gun (TWEG) instead of the planar cathode 90 and grid 92 of the Vircatron. There is a resonant cavity 98 and its dimensions in conjunction with the dimensions of the drift tube 122 (FIG. 3A) determine the output range. Conventional MILO devices have outputs between 300 MHz and 3.5 GHz. The inventor of the present invention has experimentally verified that by placing a grating surface on the inner face of the drift tube 122 (FIG. 3A), as shown in FIG. 3B, it is possible to generate RF at much higher frequencies than those available from a smooth bore drift tube 122. The source of this RF is due to the Smith-Purcell effect which describes the interaction of a relativistic electron beam with a grating surface 123. Outputs in the THz range are possible. The grating surface can be formed by many methods. The spacing, face angle and grating geometry all are determinants in the frequency achieved (FIG. 3B). It has been determined that the preferred embodiment of the drift tube grating is an internal thread as shown in FIGS. 3A and 3B. By altering the thread parameters, the output frequency is changed. The ends of the Drift Tube 125 are radiused to minimize formation of undesirable electric field perturbations inside the Resonant Cavity 98.

The balance of the SXE-MILO driver is the same as the SXE-Vircator. In fact, the RF heads—Vircator and MILO—can be interchanged. As in the case of the SXE-Vircator, the TWEG of the MILO has a hollow center through which the x-rays pass. The electron output from the TWEG is compressed by the drift tube 122 and oscillates in the resonant cavity 98.

DRAWING REFERENCE NUMBERS

The following list of drawing reference numbers has three columns. The first column includes drawing reference numbers; the second column specifies the parts associated with the reference numbers; and the third column mentions a preferred material (if applicable) for the parts.

| REFERENCE NUMBER LIST | | PREFERRED MATERIAL |
| --- | --- | --- |
| 64 | Anode | Refractory Metal; Hi-Z |
| 66 | Grid | Refractory Metal |
| 68 | Cathode | Graphite (Preferred Embodiment) |
| 70 | Coaxial Capacitor | Dielectric/Metal Layers |
| 72 | Cathode Feedthrough | Ceramic & Metal |
| 74 | Grid Feedthrough | Ceramic & Metal |
| 78 | Radiation Shield | Lead |
| 94 | Anode Mesh | Refractory Metal |
| 96 | Output Window | RF Transparent Low-Z Ceramic |
| 98 | Resonant Circular Cavity | Stainless Steel or Copper |
| 100 | Mounting Flange | Stainless Steel |
| 102 | Cathode Feedthrough | Ceramic & Metal |
| 106 | Grid Feedthrough | Ceramic & Metal |
| 110 | Getter Pump | n/a |
| 112 | Getter Pump Feedthrough | Ceramic & Metal |
| 114 | MILO Cathode | Graphite |

-continued

| REFERENCE NUMBER LIST | | PREFERRED MATERIAL |
| --- | --- | --- |
| 116 | MILO Cathode Support | Refractory Metal |
| 118 | MILO Grid | Refractory Metal |
| 120 | MILO Grid support | refractory Metal |
| 122 | Drift Tube | Refractory Metal |
| 123 | Grating Surface | Refractory Metal |
| 124 | Drift Tube Support | Ceramic |
| 125 | Radiused end of Drift Tube | Refractory Material |
| 126 | Internal Anode Insulator | Ceramic |
| 142 | Grid Output Terminal | Refractory Metal |

The foregoing describes a drift tube where the inclusion of a grating surface on the inner surface of the tube generates higher frequencies of RF radiation.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. System for producing electromagnetic radiation with enhancement from a drift tube containing a cylindrical Smith-Purcell structure, comprising:
   a) a magnetically insulated linear oscillator having a cylindrical resonant cavity containing a traveling wave electron gun and cooperating anode, and further containing a drift tube positioned between the traveling wave electron gun and the cooperating anode;
   b) the drift tube being formed of a hollow cylindrical conductive element that is positioned within said resonant cavity and that is electrically isolated from the traveling wave electron gun, wherein a cylindrical axis of the drift tube is coaxial with a main axis of the resonant cylindrical cavity in a region between said electron gun and said anode;
   c) the drift tube having an inner surface and a pair of ends; the hollow cylindrical conductive element being enhanced by containing a cylindrical Smith-Purcell grating surface formed on the inner surface of the drift tube; said grating surface comprising a reflection grating surface having a series of ridges spaced apart by respective grooves; said reflection grating surface extending for at least a majority of the length of the drift tube;
   d) the drift tube being adapted so that an electron beam, from the electron gun, passes through the inner space of the drift tube and interacts with the internal Smith-Purcell grating surface, so as to produce RF radiation by Smith-Purcell Effect; and
   e) the drift tube being further adapted so that spacing, face angle and shape of the Smith-Purcell grating surface, and an energy of the electron beam are determinants of the frequency of the RF radiation.

2. The system of claim 1, wherein the Smith-Purcell grating surface comprises an internal thread extending for at least a majority of length of the drift tube.

3. The system of claim 1, wherein each ridge of the reflection grating surface has a cross-section, taken along a plane passing through said cylindrical axis of the drift tube, comprising a triangle having one side parallel to said cylindrical axis.

* * * * *